United States Patent [19]
Lee

[11] Patent Number: 5,213,456
[45] Date of Patent: May 25, 1993

[54] PLUG CUTTER

[75] Inventor: Leonard G. Lee, Ottawa, Canada

[73] Assignee: Lee Valley Tools, Ltd., Ottawa, Canada

[21] Appl. No.: 762,656

[22] Filed: Sep. 19, 1991

Related U.S. Application Data

[63] Continuation of Ser. No. 614,618, Nov. 16, 1990, abandoned.

[51] Int. Cl.[5] .................................................. B23B 51/05
[52] U.S. Cl. ................................. 408/203.5; 408/204
[58] Field of Search ............... 408/703, 204, 209, 67, 408/68, 203.5, 207; 144/23; 125/20

[56] References Cited

U.S. PATENT DOCUMENTS

| 117,786 | 8/1871 | Kniffen | 408/86 |
|---|---|---|---|
| 473,231 | 4/1892 | Leffel | 408/204 |
| 475,560 | 5/1892 | Heydenreich | 408/205 |
| 476,312 | 6/1892 | Resche | 408/86 |
| 2,027,139 | 1/1936 | Abramson et al. | 408/205 |
| 2,748,812 | 6/1956 | Stearns | 408/204 |
| 2,978,002 | 4/1961 | Ransom | 408/205 |
| 3,130,763 | 4/1964 | Schlosser et al. | 408/204 |
| 4,295,763 | 10/1981 | Cunniff | 408/86 |
| 4,452,554 | 6/1984 | Hougen | 408/206 |
| 4,573,838 | 3/1986 | Omi et al. | 408/204 |
| 4,595,321 | 6/1986 | Van Dalen | 408/205 |
| 4,767,204 | 8/1988 | Peterson | 408/204 |

FOREIGN PATENT DOCUMENTS

| 293770 | 3/1915 | Fed. Rep. of Germany | 408/204 |
|---|---|---|---|
| 1040092 | 5/1953 | France | 144/23 |
| 2535635 | 5/1984 | France | 408/203.5 |
| 96710 | 6/1982 | Japan | 408/204 |

OTHER PUBLICATIONS

Trend Routing Technology Catalog p. 43.

Primary Examiner—Daniel W. Howell
Attorney, Agent, or Firm—Kilpatrick & Cody

[57] ABSTRACT

A woodworking tool for cutting plugs having a shank, a generally cylindrical body, and a plurality of blades defining an internal longitudinal bore having a rounded portion, a constant diameter portion, and a flared portion.

5 Claims, 1 Drawing Sheet

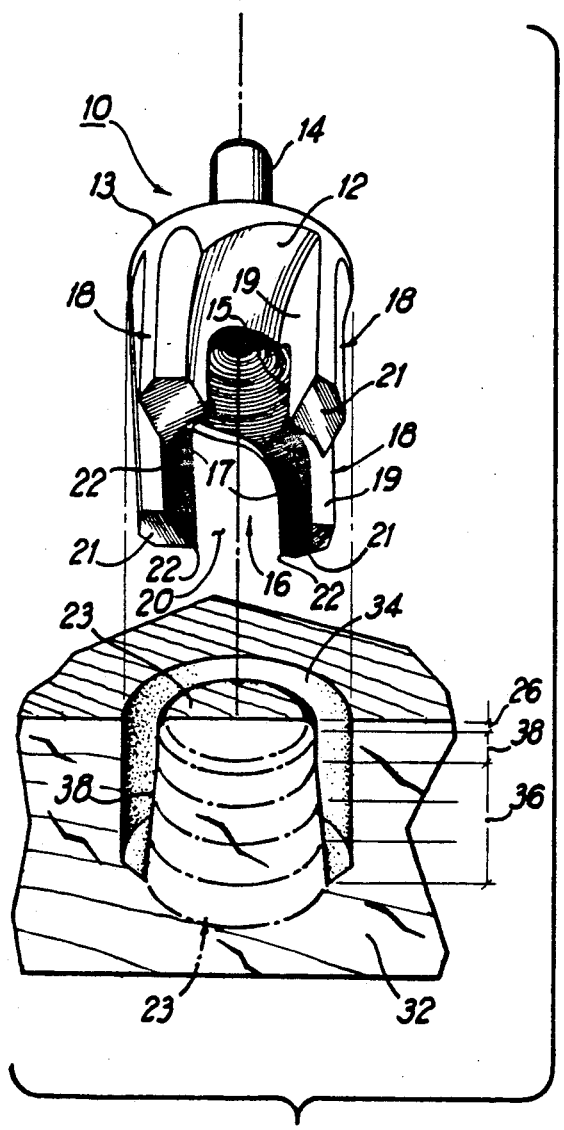
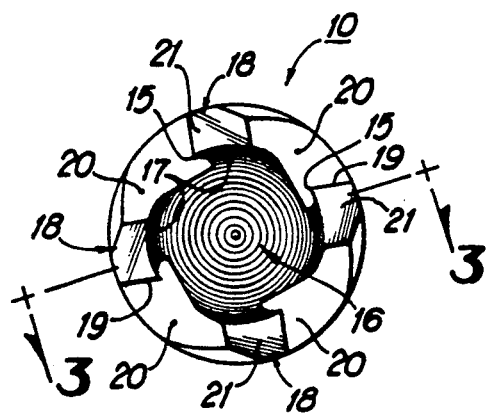
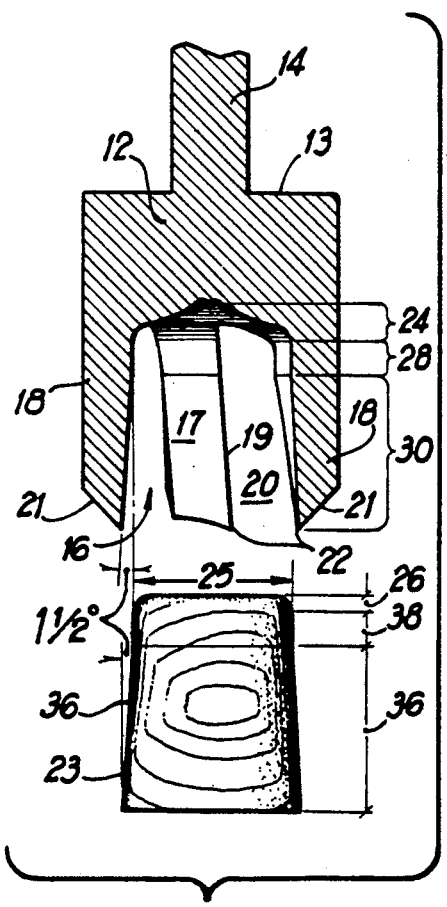
FIG 1
FIG 2
FIG 3

PLUG CUTTER

This is a continuation of copending application Ser. No. 07/614,618 filed on Nov. 16, 1990, now abandoned.

BACKGROUND OF THE INVENTION

Woodworkers and carriage makers long have inserted wood plugs cut across the grain of wood in countersunk screw holes, or similar holes, to hide the screw or otherwise fill or conceal the hole. Plugs cut from across the wood grain are more desirable than plugs cut from end grain, such as dowels, because cross grain plugs more closely match the grain and texture of the wood being plugged, and when stained or otherwise finished, provide a nearly invisible plug.

Two types of plugs have been long known, cylindrical plugs with straight sides and tapered plugs with sides that narrow slightly. Various chamfers have been used on both cylindrical and tapered plugs. For example, U.S. Pat. Nos. 117,786, 473,231, 475,560, 476,312, 2,748,817, 3,130,763, and 4,595,321 describe plug cutters which will cut cylindrical plugs. U.S. Pat. Nos. 2,027,139 and 4,295,763 describe plug cutters which will produce tapered plugs. However, neither plug type has been entirely satisfactory. Cylindrical plugs must necessarily be made slightly smaller than the hole being plugged so that the plug can be inserted easily. This size difference frequently leaves a small, noticeable gap between the plug and the hole side, particularly because tolerances are difficult to control in forming both the cylindrical plugs and the holes which are to receive the plugs. For instance, this gap is magnified if the hole is not perfectly round. Furthermore, cylindrical plug cutters tend to tear and burn rather than cut the fibers on the side of the plug. This tearing and burning produces a roughened plug, thereby causing a poor fit, difficult insertion, and voids which can be exposed when the top of the plug is finished level with the workpiece.

In addition, inserting a cylindrical plug often involves tilting the plug, thereby crushing the fibers on one side of the hole and producing a noticeable gap. Finally, cylindrical plugs tend to rotate during the final step of insertion, when they are typically tapped into place, thereby causing the grain of the plug to be misaligned with the grain of wood of the workpiece into which the plug is being inserted. This misalignment causes the plug to be much more noticeable and is therefore undesirable.

Tapered plugs also have their drawbacks. Although tapering the plug helps to reduce the gap between the plug and the side of the hole, tapered plugs contact the workpiece only at a thin ring adjacent to the finished surface, which allows the plug to rock within the hole and does not provide an adequate gluing surface. Consequentially, tapered plugs are not as secure as cylindrical plugs and may work loose or cause an uneven finished surface. Indeed, surface sanding of the plug and adjacent area after the plug has been secured can destroy the ring of contacting surface, causing the tapered plug to be loosened or revealing a gap between the plug and workpiece.

U.S. Pat. No. 4,295,763 (Cunniff), describes a device that cuts a large diameter plug with two different tapers for plugging holes bored in exterior walls for the insertion of insulation into the wall cavities. However, the Cunniff device does not solve the above-described problems associated with prior art plugs because plugs cut with the Cunniff device are not appropriate for conventional woodworking applications and are inserted with the steeper taper first (which thus functions as a chamfer). As a result, the second taper contacts the hole side and there is minimum contact between the plug itself and the side of the hole, reducing the gluing surface and increasing the likelihood that the plug will rock.

SUMMARY OF THE INVENTION

The present invention is a device for cutting plugs that have a cylindrical and a flared portion in the shape of a truncated cone. The cylindrical portion of the plug is inserted first and is substantially the same size as the hole into which the plug is being inserted. This cylindrical portion provides for a larger gluing area than is available in a conventional tapered plug, substantially fills the hole, and because of its cooperation with the flared portion, reduces the tendency of the plug to rock or work loose. A rounded end or chamfer on the cylindrical portion facilitates plug insertion.

The flared portion of the plug cut with the present invention completely fills the mouth of the hole and eliminates any gap between the hole and the plug. In addition, the use of a gently flared portion reduces the tendency of the plug to rotate when the plug is tapped into place (and is no longer being held to prevent rotation). Finally, the plug cutter of the present invention forms the surface of the flared and cylindrical portions by first cutting the fibers and then shaving the plug sides, producing a smooth plug which is easier to insert and has a minimal number of voids which might be exposed when the workpiece is finished.

Accordingly, one objective of the present invention is to provide a plug cutter that produces plugs which minimize the gap between the plug and the side of the hole in which the plug is being inserted.

Another objective of the present invention is to provide a plug cutter that produces plugs with smooth sides.

A further objective of the present invention is to provide a plug cutter that produces plugs that do not rotate during insertion.

Another objective of the present invention is to provide a plug cutter that produces plugs with both cylindrical and flared portions and provides a large contact area with the side of the hole into which the plug is being inserted.

These and other objectives and advantages of the present invention will become apparent from the detailed description and claims which follow.

BRIEF DESCRIPTION OF THE DRAWINGS

FIG. 1 is a worm's eye perspective view of the plug cutter of the present invention exploded away from a sectioned bird's eye perspective view of a workpiece.

FIG. 2 is a bottom plan view of the plug cutter of FIG. 1.

FIG. 3 is a section taken along lines 3—3 in FIG. 2 with a section view of a plug cut by use of the plug cutter exploded away from the plug cutter.

DETAILED DESCRIPTION OF THE DRAWINGS

FIG. 1 illustrates the plug cutter 10 in an exploded perspective view. Plug cutter 10 includes a body 12 and a shank 14 attached to body 12 at shoulder 13. Plug cutter 10 is used by inserting shank 14 in a drill press chuck (not illustrated) or similar means for rotating plug cutter 10.

Body 12 has a upwardly extending bore 16 defined by a plurality of spiral or helical blades 18, angled in the direction of rotation of plug cutter 10, and attached at shoulder 13. The leading face 19 of each blade 18 (assuming clockwise rotation when looking at shank 14 of plug cutter 10) intersects with dished end 21 of blade 18 to define cutting edge 22. The diameter of the circle defined by the outermost position of edges 22 during plug cutter 10 rotation is substantially the same as the diameter of shoulder 13.

As can be seen in FIG. 3, the diameter of bore 16, which is defined by the interior faces 17 of blades 18, varies along the length of bore 16. At the point where blades 18 attach at shoulder 13, the diameter of bore 16 varies from zero to the nominal diameter 25 of the desired plug 23, thereby defining a domed section 24 which may be rounded or steeply tapered. The domed design of section 24 prevents the plug cutter 10 from marring the end of plug 23, and cuts an eased edge 26, which may be a rounded shape or a chamfer, for easing the insertion of plug 23.

Travelling longitudinally along bore 16 from section 24, the diameter of bore 16 remains constant at the nominal diameter 25 of plug 23 for a short length, thereby defining cylindrical section 28. Continuing from cylindrical section 28, the diameter of bore 16 increases slightly, for example, at a rate of 3° (1½° per side) off vertical, until reaching cutting edges 22, thereby defining flared section 30.

When used, shank 14 is inserted in a drill press or similar means and plug cutter 10 is rotated. Cutting edges 22 of rotating plug cutter 10 are then pressed into contact with material 32, cutting a round groove 34 which has an interior diameter substantially equal to that of bore 16 at cutting edges 22. As plug cutter 10 and edges 22 progress deeper into material 32, scraping edges 15 defined by leading faces 19 and interior faces 17 of blades 18 shave plug 23, producing a smooth flared surface 36. Waste removed by cutting edges 22 and scraping edges 15 escape through slots 20. Finally, as plug cutter 10 is fully lowered into material 32, scraping edges 15 of cylindrical section 28 of blades 18 shave plug 23, producing a smooth cylindrical portion 38 on plug 23 and domed section 24 of blades 18 shave an eased edge 26 at the end of plug 23.

This description is given for purpose of illustration and explanation. It will be apparent to those skilled in the relevant art that modifications and changes may be made to the invention as described above without departing from its scope and spirit.

I claim:

1. A plug cutter comprising a shank connected to a body and a plurality of blades depending from the body that define a bore having, progressing away from the body, a constant diameter portion and a gently outwardly flared portion that is longer than the constant diameter portion and terminates at tips that define a mouth that is wider than any other portion of the bore.

2. A plug cutter comprising a shank connected to a body and a plurality of blades depending from the body that define a bore having, progressing away from the body, a constant diameter portion and an outwardly flared portion that is longer than the constant diameter portion and terminates at tips that define a mouth that is wider than any other portion of the bore, wherein the blades further define a rounded portion between the body and the constant diameter portion.

3. The plug cutter of claim 1 wherein the blades are substantially helical and contain cutting edges at the tips and scraping edges defining the bore.

4. A plug cutter comprising a shank connected to a body and a plurality of blades depending from the body that define a bore having, progressing away from the body, a constant diameter portion and an outwardly flared portion terminating at tips that define a mouth that is wider than any other portion of the bore, wherein the flared portion flares outwardly at approximately 3°.

5. A plug cutter comprising:
a) a shank;
b) a body having a shoulder; and
c) a plurality of helical blades having tips containing scraping edges that define a longitudinal bore within the body, the bore having, progressing from the body, a rounded edge producing portion, a constant diameter portion and a flared portion flaring outwardly away from the constant diameter portion at approximately 3° and cutting edges at the tips that define a mouth that is wider than any other portion of the bore.

* * * * *